US005979861A

United States Patent [19]
Weaver

[11] Patent Number: 5,979,861
[45] Date of Patent: Nov. 9, 1999

[54] PIVOT BRACKET FOR STOWING OUTBOARD MOTOR ON STOWED DINGHY

[76] Inventor: Robert J. Weaver, 13305 Smokey Pt. Blvd., Marysville, Wash. 98271-8929

[21] Appl. No.: 08/967,690

[22] Filed: Nov. 12, 1997

[51] Int. Cl.[6] .......... F16M 1/00
[52] U.S. Cl. .......... 248/642; 248/643; 248/640; 440/53
[58] Field of Search .......... 440/53; 446/6; 248/640, 641, 642, 643, 299.1, 292.12, 292.14, 214

[56] References Cited

U.S. PATENT DOCUMENTS

| | | | |
|---|---|---|---|
| 1,172,176 | 2/1916 | Stanley | 440/55 |
| 2,740,602 | 4/1956 | Kloss | 248/643 |
| 3,053,489 | 9/1962 | Robinson et al. | 248/642 |
| 3,371,893 | 3/1968 | Blanchard | 248/642 |
| 4,391,592 | 7/1983 | Hundertmark | 440/61 |
| 4,850,295 | 7/1989 | Weaver | 114/259 |
| 4,925,410 | 5/1990 | Boda | 440/55 |
| 5,169,350 | 12/1992 | Tsujii | 440/61 |
| 5,669,794 | 9/1997 | Knight et al. | 440/63 |

OTHER PUBLICATIONS

Adventure Dinghy Bracket Model 3000, Adventure Advantage Product brochure, Adventure Marine, Inc., Langley, BC, Canada (undated).

*Primary Examiner*—Leslie A. Braun
*Assistant Examiner*—Gwendolyn Baxter
*Attorney, Agent, or Firm*—Graybeal Jackson Haley LLP

[57] ABSTRACT

An outboard motor stow pivot bracket is disclosed for stowing a motor in a generally vertical orientation while mounted on the transom of a dinghy which itself is swung beamwise (on beam ends) from a horizontal, in-the-water position up into a generally vertical stowed position on the back of a carrier boat such as on the stern of a pleasure craft. The pivot bracket includes a channel structure sized to fit on the motor-support edge of the dinghy transom and has outside surfaces adapted to receive the standard transom clamp of an outboard motor. At opposite ends of the channel structure are a pair of complementary pivot journals, and a pivot bolt connects a selected one of these pivot journals to a support structure on the dinghy transom in a universal construction that allows the user to assemble the bracket for pivoting in one direction or the other, depending upon the desired orientation of the motor and of the dinghy in their stored positions. A locking toggle connected between the channel structure and support on the dinghy transom locks the channel structure and the clamped motor in the stored position pivoted 90 degrees to the support edge of the dinghy transom.

22 Claims, 5 Drawing Sheets

PIVOT BRACKET FOR STOWING OUTBOARD MOTOR ON STOWED DINGHY

BACKGROUND OF THE INVENTION

This invention relates to devices for mounting outboard motors on the transom of small boats, such as hard shell and inflatable dinghies especially of the type suitable for being carried in a raised, generally vertical stowed position on the stern of a larger boat. More particularly, the invention concerns a mechanism for allowing the outboard motor to be pivoted to and from a stowed position without removing it from a clamped, secured mounting on the dinghy transom ready for use.

Dinghies of all types are often carried on the stern of a pleasure craft using davit systems such as the type disclosed in U.S. Pat. No. 4,850,295 which allow the dinghy to be swung from a horizontal, in-water position about the beams end of the dinghy into a raised vertical, out-of-water stowed position. The davits are often mounted on the swim step or other stern support structure so that one side of the dinghy can be pulled up to place it in the stowed position and carried in a raised stowed condition ready for being launched off the back of the pleasure craft.

In the stowed position, the upper edge of the dinghy transom that supports the outboard motor becomes substantially vertical, an orientation that makes for an awkward, and often hazardous positioning of the outboard thrust or propeller stem. For example, the outboard motor will become horizontal when the dinghy is stowed in the manner described above, projecting the stem outwardly beyond a side of the carrier boat making for a dangerous obstruction. Also the motor including internal fluid cavities and external components may not ride well in the horizontal position. For these reasons, boat owners often remove the outboard motor from the dinghy each time the dinghy is raised into its stowed position on the back of the pleasure craft and then return the motor to the dinghy when it is launched. Furthermore, this requires providing another stowage bracket or location for the outboard motor when the dinghy is stowed and the removing and remounting of the outboard motor can be dangerous to the operator as well as risk dropping the motor into the water.

Other devices and means for solving this problem have exhibited certain disadvantages including difficulty of use, unsafe clamping and securement, excessive weight, cost and susceptibility of damage in marine environments, especially corrosive salt water conditions.

SUMMARY OF THE INVENTION

With this background in mind, the present invention in its preferred form provides an outboard motor stow pivot bracket for stowing a motor in a generally vertical orientation while mounted on the transom of a dinghy which itself is swung beamwise (on beam ends) from a horizontal, in-the-water position up into a generally vertical stowed position on the back of a carrier boat such as on the stern of a pleasure craft. For example, the pleasure craft may be of the type equipped with a swim step and dinghy davits are mounted on the swim step to connect one side of the dinghy in order to allow the opposite side to be pulled up so that the interior of the dinghy faces toward the stern of the carrier craft and motor support edge of the dinghy transom is now generally vertical. The pivot bracket includes a channel structure sized to fit on the motor-support edge of the dinghy transom and has outside surfaces adapted to receive the standard transom clamp of an outboard motor. At opposite ends of the channel structure are a pair of complementary pivot journals, and a pivot bolt connects a selected one of these pivot journals to a support structure on the dinghy transom. The pair of pivot journals provides a universal construction that allows the user to assemble the bracket for pivoting in one direction or the other, depending upon the desired orientation of the motor and of the dinghy in their stored positions. The pivot journal and complementary pivot bolt allows the channel structure to which the outboard motor is clamped to be swung on an axis orthogonal to the standard motor drive tilt axis of the outboard motor clamp so that in a down condition of the channel structure resting on the transom support edge, the outboard motor is ready for a use. In the pivoted stowed position, the motor is pivoted with the channel structure about 90 degrees to a stowed position which places the thrust or propeller stem in a generally vertical position when the dinghy itself is in its stowed vertical position on the back of the-carrier or pleasure craft.

Also in the preferred embodiment, the pivot bracket is equipped with a locking toggle that connects between the channel structure and support on the dinghy transom to lock the channel structure and the clamped motor in the stowed position pivoted 90 degrees to the support edge of the dinghy transom. The locking toggle preferably has a pair of toggle links that are rotatably joined at adjacent first ends and are formed with a hand-operable release lock in the form of a locking pin insertable in the holes provided in the toggle links to securely lock the bracket in the stowed, and also preferably in the down motor operating position.

In order to provide for safe operation of the bracket during movement of the motor between the down operating position and the pivoted stowed position, one of the toggle links is provided with a series of intermediate stop holes received by the locking pin which is spring biased to move to the locked position so that two hands are required to move the motor between its stowed and operative position, one on the motor or bracket handle to lift or lower and the other on the hand-operated lock. This construction requires that both hands of the operator be held in safe areas away from the edge of the transom where the channel comes to rest. When used with outboard motors in the 10 to 15 horsepower range, the weight of the motor is considerable and the safety feature described above is significant as the motor weight will tend drive the channel structure down onto the transom edge with great force.

Still another feature of the preferred embodiment is the provision of a pair of complementary handles one on each end of the channel structure adjacent the pivot journals. The handle that is opposite the bolted pivot journal is used to assist in raising and lowering the channel structure and outboard motor.

Also in the preferred embodiment, the bracket includes a right angle support structure that is conveniently shaped to mount in a semipermanent fashion on the transom, bolted through the transom wall and providing the bolt supports for the pivot journal bearings and a supporting structure for the locking toggle which is preferably mounted on the inside wall of the dinghy transom so as to be readily accessible from inside the dinghy or from the stern of the carrier craft. By using a single locking toggle mounted substantially midbracket between the complementary pivot journals of the transom support and channel structure, it is a simple matter to switch the pivot location from one side of the universal bracket to the other without changing the configuration or mounting of the locking toggle.

BRIEF DESCRIPTION OF THE DRAWINGS

The foregoing and additional features of the present invention will be more fully appreciated when considered in light of the following specification and drawings in which.

DETAILED DESCRIPTION OF THE INVENTION

Figure 1:
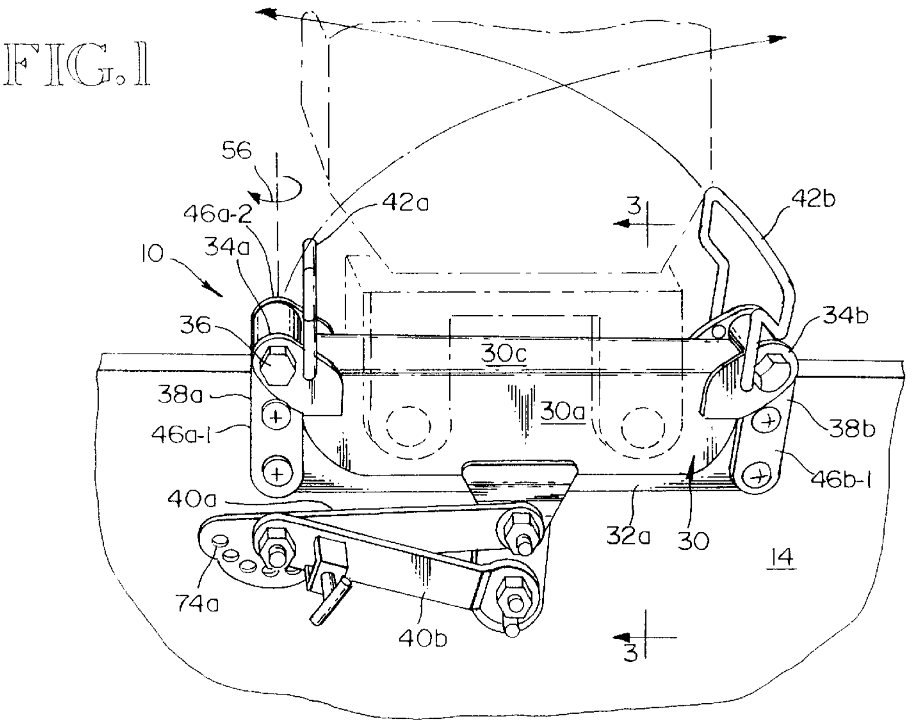
FIG. 1 is an isometric view looking from inside the dinghy at a slightly elevated position aft to the pivot bracket of the present invention in which the outboard motor and its standard transom clamp are shown by dotted lines.
Figure 2:
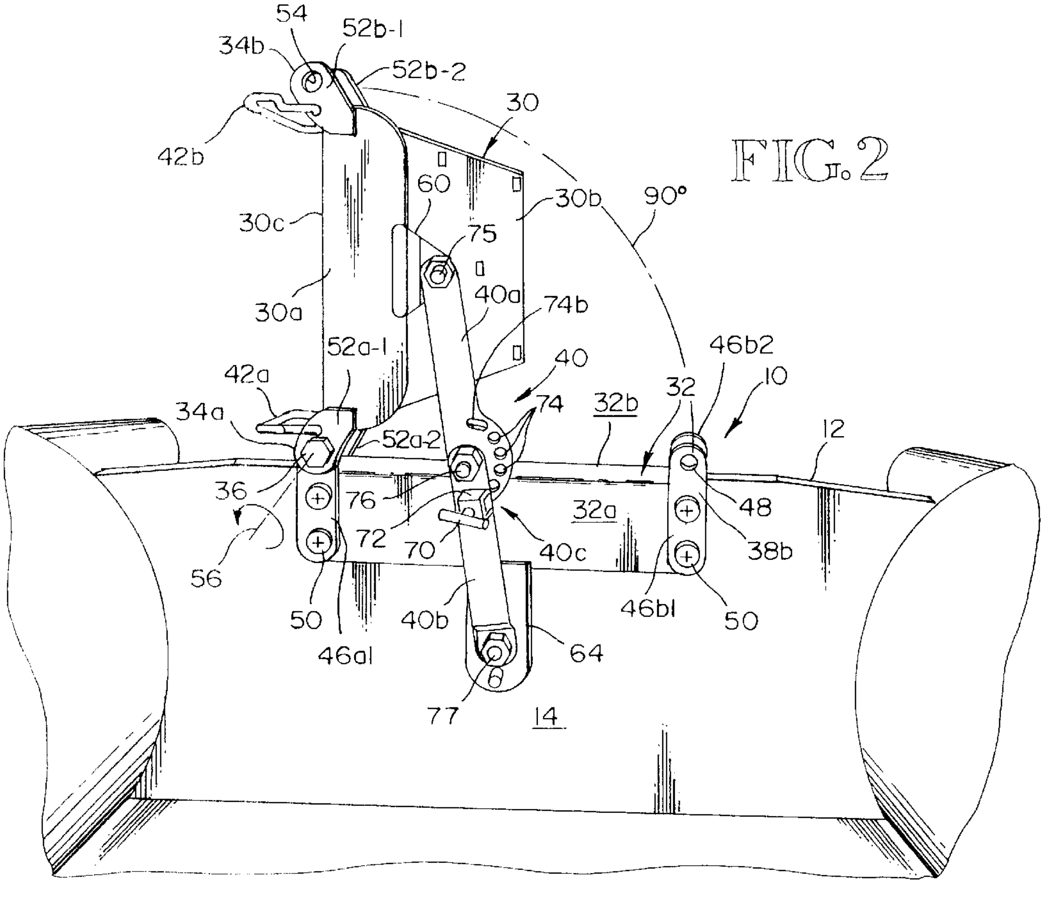
FIG. 2 is another isometric view of the pivot bracket of FIG. 1 showing it in a raised stowed position in which a channel-shaped structure to which the outboard motor is clamped (not shown in FIG. 2) has been pivoted about one of the pivot points into a 90 degrees stored orientation relative to the transom support edge as illustrated.
Figure 3:
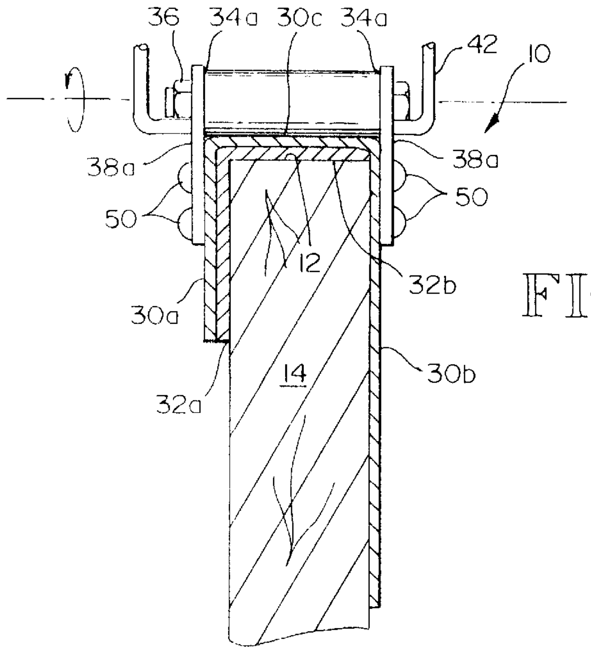
FIG. 3 is vertical section of view taken through the section plane 3—3 indicated in FIG. 1 and showing the mounting of the pivot bracket to the transom.
Figure 4A:
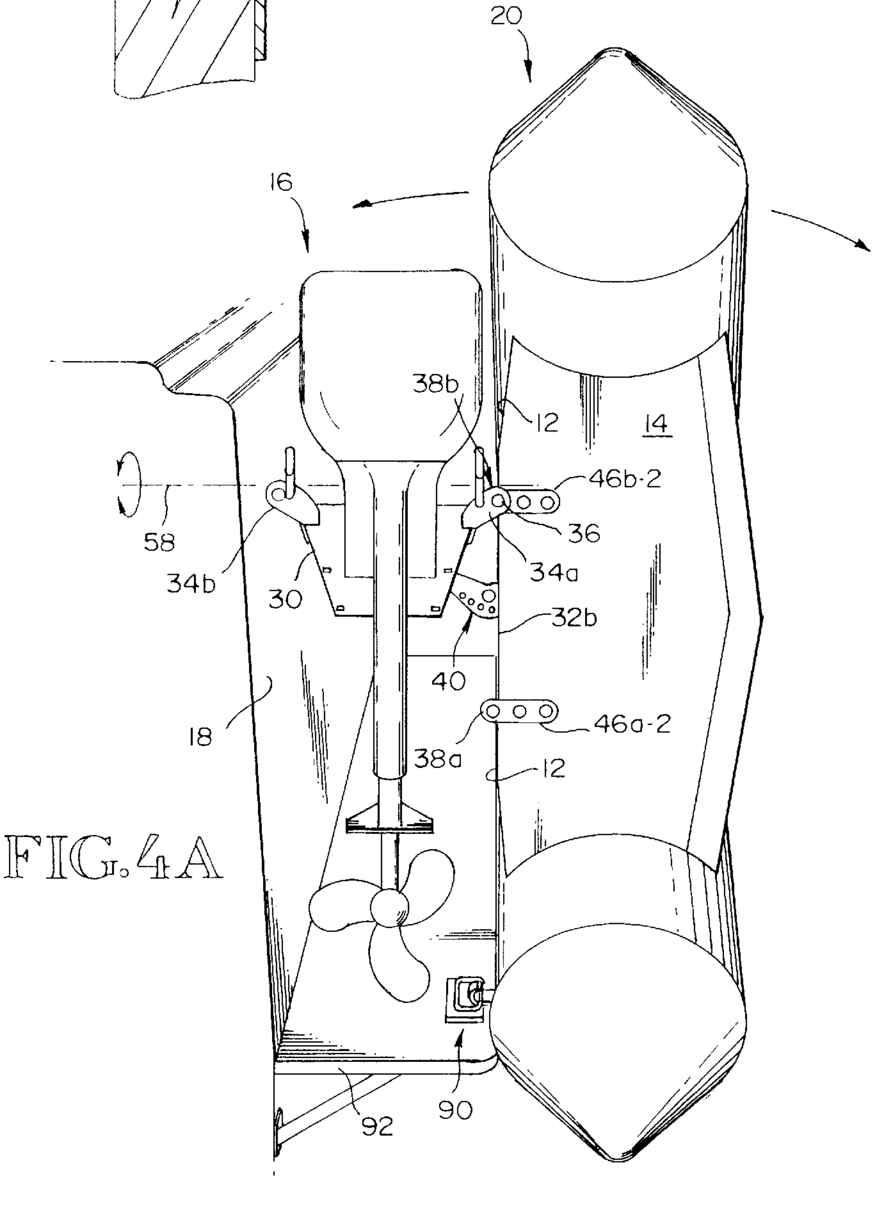
FIG. 4A is an isometric view taken from a vantage point off to the side of the carrier boat looking slightly downwardly toward the stowed dinghy and stowed outboard motor with the pivot bracket channel structure pivoted up into its stored orientation relative to the transom motor support edge.

An outboard motor stow pivot bracket 10 as shown in FIGS. 1, 2, and 3 mounts to the transom 14 adjacent an upper outboard motor support edge 12 of a dinghy or small boat. Bracket 10 enables an outboard motor 16 as depicted in FIG. 4A to be stowed in a generally vertical orientation while still mounted on the transom 14 of the dinghy which itself has been swung beamwise (on beam ends) from a level position up into a generally vertical stowed position. This arrangement is common when carrying a dinghy on the stern 18 of a pleasure craft or other larger carrier boat. In the application illustrated in the drawings, dinghy 20 as shown in FIG. 4A is of the inflatable type having air inflated tubular side walls and bow, and transom 14 is fixed between the tubular walls somewhat forward of the aft ends of the tubular side walls.

The main components of bracket 10 in accordance with the preferred embodiment include a channel structure 30 sized to fit onto the upper motor support edge 12 of dinghy transom 14 and including front and back wall portions 30*a* and 30*b* connected by a bridging wall portion 30*c* which together form inside surfaces of the channel that seat on upper edge 12 of transom 14. A transom support structure 32 formed by a front plate portion 32*a* and an upper right-angle flange portion 32*b* sized so that when plate portion 32*a* is fastened to the inside vertical face of transom 14 then angle flange portion 32*b* rests congruently on the upper edge 12 of the transom for receiving the weight of the pivoted channel structure 30. A pair of complementary left- and right-hand pivot journals 34*a* and 34*b* are provided at opposite lateral ends of channel structure 30 and one of these journals is mounted by a pivot bolt 36 to one of a pair of laterally spaced bearing structures 38*a* and 38*b* secured with the support plate 32*a* to transom 14 so that the channel structure depending upon the desired orientation can rotate about either bearing 38*a* or bearing 38*b* as illustrated in FIG. 1. More particularly as shown in FIG. 2, a starboard pivot configuration is selected so that channel structure 30 pivots approximately 90 degrees on pivot bolt 36 securing journal 34*a* to bearing 38*a*. A locking toggle mechanism 40 including a pair of toggle links 40*a* and 40*b* and a hand-releasable pin lock 70 secure the extended configuration illustrated in FIG. 2 to brace the channel structure 30 in its raised stowed position off of transom edge 12 and a collapsed configuration shown in FIG. 1 in which links 40*a* and 40*b* fold to allow the channel structure 30 to pivot down into a position resting on support flange 32*b* and hence on motor support edge 12 of the transom 14.

Handles 42*a* and 42*b* are fixed to lugs forming pivot journals 34*a* and 34*b* of channel structure 30 to assist in the manual relocation of the motor and channel structure 30 between the motor operative and motor stowed positions as described more fully below.

To retain the structural integrity of transom 14, bearings 38*a* and 38*b* are each formed by a pair of upstanding lugs 46*a*-1,-2 and 46*b*-1,- 2 respectively as best shown in FIG. 2 so that upper projecting ends of these lugs are above the transom support edge 12 and have thereat in-line bearing openings indicated at 48 for lug pair 46*b*- 1 and 46*b*- 2. The lower vertical extent of lugs 46*a* and 46*b* extend downwardly along the wall of transom 14 with the inside set of lugs 46*a*- 1 and 46*b* - 1 held to the transom and support plate 32*a* by suitable fasteners 50 and the aft mounted sets of lugs 46*a*- 2 and 46*b*- 2 being held by the same fasteners 50 which project through the thickness of transom 14 to the back wall of the transom as best indicated in FIGS. 3 and 4A.

Journals 34*a* and 34*b* are formed by complementary ear-shaped lugs 52*a*-1, - 2, and 52*b*- 1,- 2 welded or otherwise permanent affixed to the front and back wall portions 30*a* and 30*b* respectively of channel structure 30 so that journal openings 54 as best shown in FIG. 2 are upwardly offset from the connective wall 30*c* of the channel structure. This configuration is so that when the channel structure is seated on flange portion 32*b* of the transom support structure, journal holes 54 align with bearing holes 48 with one side receiving the pivot bolt 36 depending upon the desired stow orientation. Handles 42*a* and 42*b* are conveniently affixed again such as by welding to the ear-shaped lugs 52*a* and 52*b* as illustrated in FIGS. 1, 2 and 3. With this arrangement, a motor clamped to the channel structure 30 as described below can be pivoted about a stow pivot axis 56 passing through the selected one of complementary and hence universal pivot journals provided by lugs 52*a* and 52*b* on structure 30 in which the axis 56 is normal to the plane of transom 14 and hence substantial orthogonal to the standard motor tilt axis 58 shown in FIG. 4A and discussed below in the mounting and use of the stow pivot bracket. When the channel structure 30 is pivoted down onto the support 32 the rear wall portion 30*b* slips between lugs 46*a*-2 and 46*b*-2 and is thus formed with downwardly and inwardly tapered sides giving it a trapezoidal shape and is some what greater in the vertical dimension than the inside front channel wall 30*a* for increased support to resist the motor thrust.

The preferred embodiment of toggle lock 40 is uniquely designed for safety and includes a spring-biased, hand-released lock pin mechanism 40*c* requiring one hand to release the toggle lock for moving the motor and channel structure between the stowed and operative positions on the dinghy transom. More particularly, one of toggle links 40*a*, has its remote end rotatably fastened to the inner and front wall portion 30*a* of channel structure 30 at a triangular-shaped boss 60 and the other end is rotatably fastened to the adjacent end of the second toggle link 40*b* as best shown in FIGS. 1 and 2. The remote end of the second toggle 40*b* is rotatably fastened to a downwardly depending boss 64 welded to the inside support plate 32*a* substantially midway between the pivot bearings. The rotational joints of the various toggle links allow the linkage to articulate in a common plane parallel to the motion of channel structure 30. Lock 40*c* has a T-shaped locking pin 70 mounted for movement in a housing 72 that in turn contains a bias spring (not separately shown) that biases the operative end of the T-shaped pin 70 through a guide hole (not separately shown) in link 40*b* so as to engage a series of locking or detent holes 74 arranged in a semicircular pattern on an enlarged end of the toggle link 40*a* centered at pivot bolt 76. At the ends of the hole pattern 74 a pin locking hole 74*a* shown in FIG. 1 locks the links 40*a* and 40*b* in their in-line extended configuration holding the channel structure fixed in its 90 degrees pivoted stowed position, and at the other end of the hole pattern an oblong hole 74*b* shown in FIG. 2 is positioned to receive locking pin 70 to hold the toggle links collapsed and channel structure 30 seated on support 32*a* and transom 14. Hole 74*b* is slightly enlarged along one axis to provide loose tolerance to ensure that channel structure 30 and the inside surface of connective wall 30*c* rests securely on the upper surface of support flange 32*b*. The remote ends of toggle links 40*a* and 40*b* are rotatably held to the respective mounting bosses by pivot bolts 75 and 77.

Figure 4C:
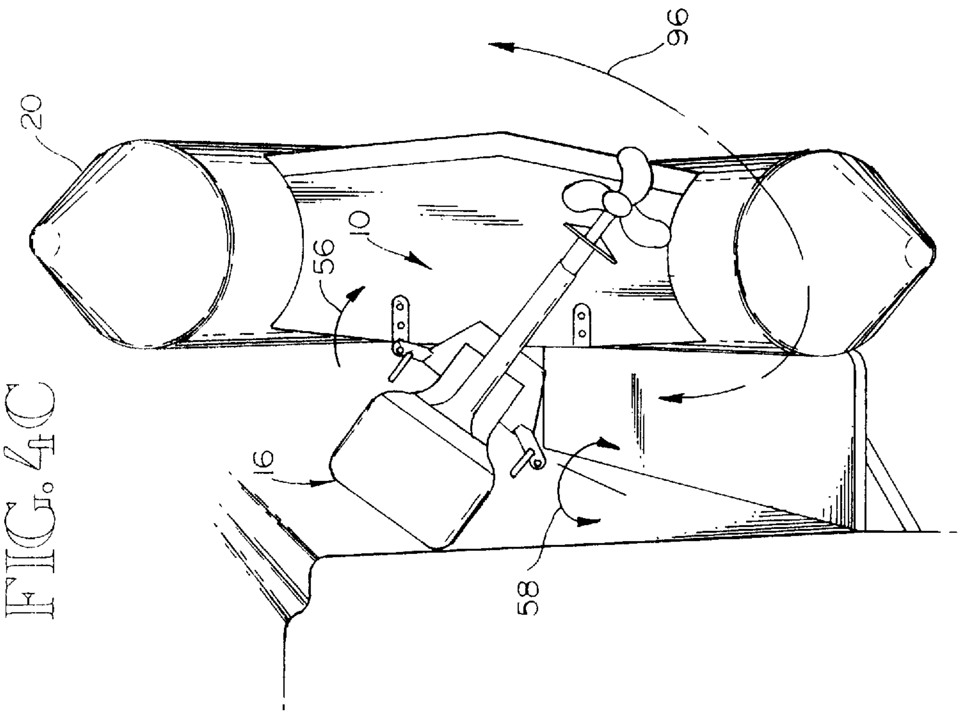
FIGS. 4B and 4C are isometric views similar to FIG. 4A but showing the different positions of the outboard motor as it is swung in an oblique path using rotation about both the tilt axis of the motor clamp and the stow pivot axis of the bracket provided in accordance with the invention in order to allow the propeller stem to clear the aft ends of the pontoons on a inflatable dinghy.
Figure 4B:
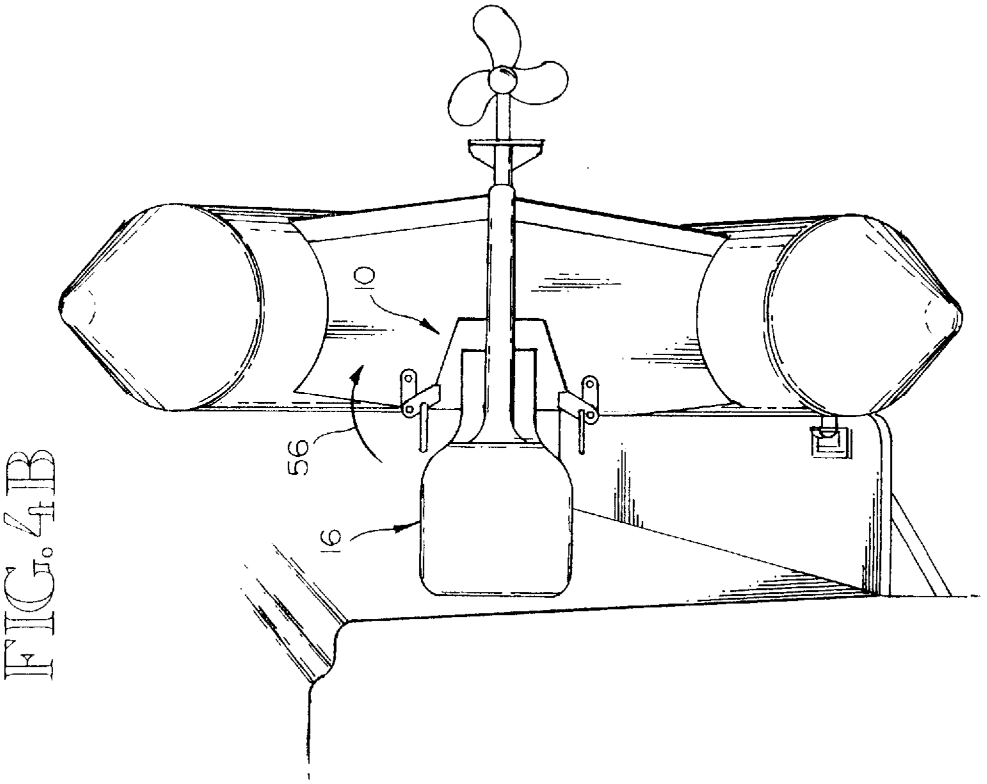

With reference to FIGS. 4A, 4B and 4C, motor 16 is clamped to the outside surfaces of parallel channel wall portions 30*a* and 30*b* of channel structure 30 is the same manner that the typical screw clamps are secured to the front and back surfaces of the transom. This operation is usually done when the channel structure is pivoted to its motor operative position seated on transom 14 such as shown in FIG. 4B, and typically when the dinghy is in its horizontal position in the water before the dinghy has been swung into its stowed position. The dinghy 20 is then swung about dinghy davits such as davit 90 shown in FIG. 4A on the aft edge of swim step 92 of the carrier craft stern 18 as described for example in U.S. Pat. No. 4,850,295 up into a vertical or on-beams end position as shown in each of FIGS. 4A, 4B and 4C. Standoffs (not shown here) may be employed to hold the elevated side of dinghy 20 in place against the stern 18 of the carrier craft. Outboard motor 16 is now articulated by rotating it on two orthogonal axes, one being the stow pivot axis 56 best shown in FIGS. 1 and 3 and the other being the standard tilt axis 58 typically provided in the motor clamp mount as an existing part of the outboard motor 16. The articulation of the motor about these two orthogonal axes allows the motor stem to be swung in an oblique path indicated by dotted line 96 in FIG. 4C so as to clear the ends of the inflatable tubular pontoons that project aft of transom 14 in the typical inflatable dinghy. Once the thrust stem of motor 16 is clear of the aft appendages of the dinghy and the channel structure with clamped motor has been fully pivoted about stow pivot axis 56 into a 90 degrees stowed orientation, then the motor 16 may be tilted about the conventional tilt axis 58 into the stowed position shown in FIG. 4A in which the motor thrust stem is vertical and extending downwardly along and parallel to the top support edge 12 of the transom 14 as illustrated. To accomplish these motions, the user has one hand grasping the handle, in this case handle 42*b* that is opposite the pivot journal of channel structure 30 and the other hand is used to pull out and hence release pin lock 70 against the above-described spring bias. Pin 70 is thereby withdrawn against the spring bias to pull it from one of the locking holes allowing the motor and channel structure 30 to be rotated about pivot 56 between the motor operative position and the raised stowed position. When either raising or lowering the motor with channel structure 30, the spring bias of the locking pin 70 and the multiple holes 74 in toggle link 40*a* provides a safety feature that prevents the motor and channel 30 from slamming down on the transom edge and perhaps causing injury to the user; in that by requiring two hands, one on handle 42*b* and the other on release pin lock 70, the user's hands are safely out of the way of the space between channel structure 30 and a transom support edge 12.

Should the user decide to move the dinghy to a different carrier boat or change the orientation of it on stern 18, pivot bracket 10 is quickly converted to the opposite pivot configuration by removing pivot bolt 36 and simply reinstalling it on the port side of the dinghy at bearing 38*b* and journal 34*b* without requiring any change in the locking toggle 40. It is in this manner that the complementary journals, bearings, handles, and pivot points with a common centrally located locking toggle, allow a universality in the installation and operation of the pivot bracket.

Figure 5:
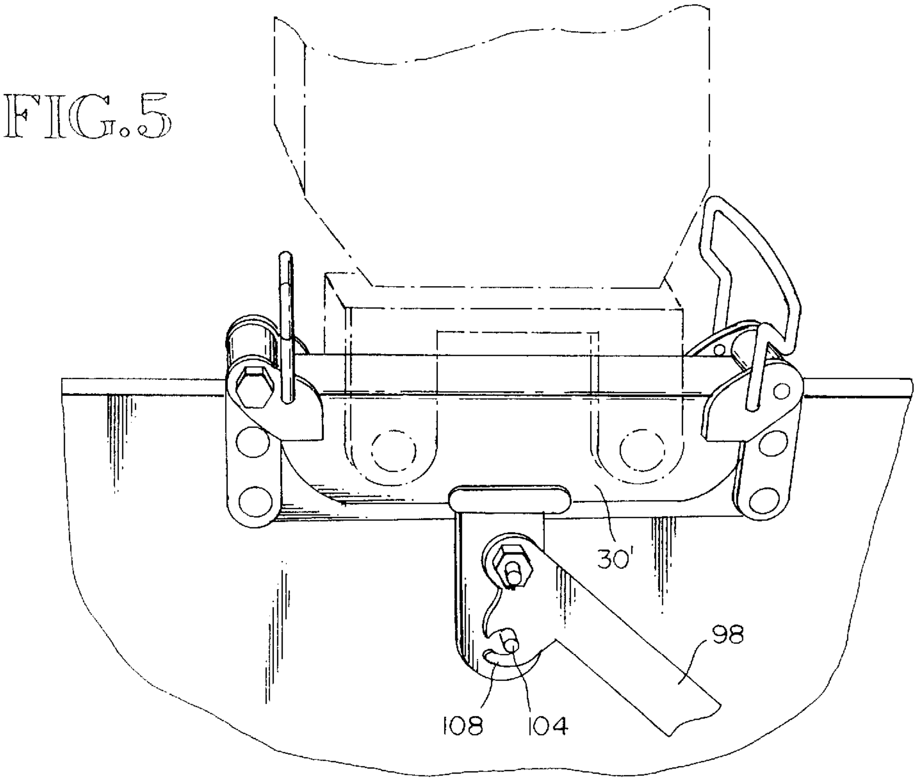
FIGS. 5 and 6 are isometric views similar to FIGS. 1 and 2 showing an alternative embodiment of the lock that secures the channel structure in its raised pivoted stowed position and in its normal motor operative position.
Figure 6:
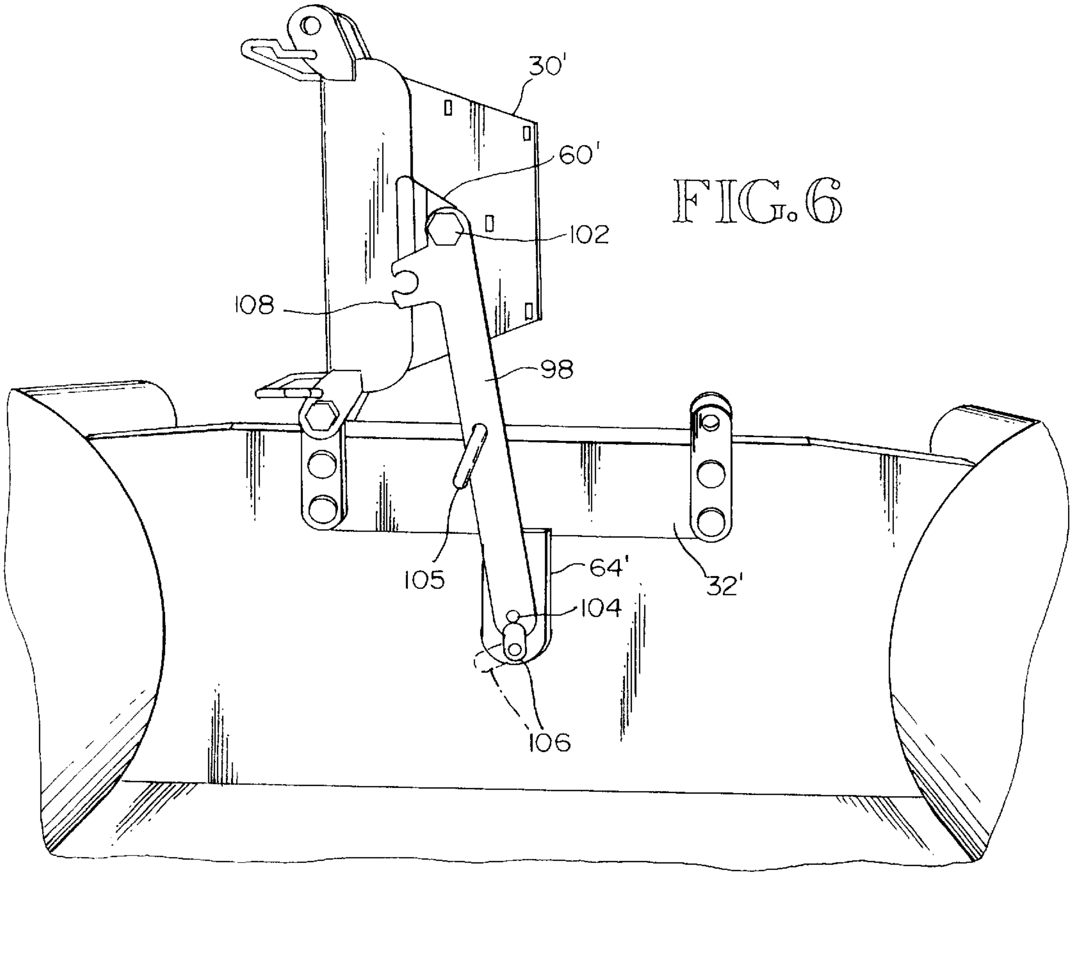

FIGS. 5 and 6 show an alternative embodiment of the locking mechanism in which the articulated toggle links of toggle lock 40 are replaced by a single straight locking bar 98 rotatably connected by a bolt 102 to the same boss 60' of the channel structure 30' as in the above embodiment and having a lower end removably connected to a locking stud 104 projecting outwardly and forwardly from boss 64' of the transom support 32'. A handle 105 assists in the use of locking bar 98 and when the channel structure is raised as shown in FIG. 6 and an opening at an end of bar 98 is supported on stud 104 and held by lock 106 on stud 104 during stowage. Bar 98 is also provided with a sideways projecting open-ended locking lug 108 near the upper pivoted end 102 for being used to lock the channel structure 30' in its down motor operative position on the projecting stud 104 held to support structure 32' as shown in FIG. 5.

Figure 7:
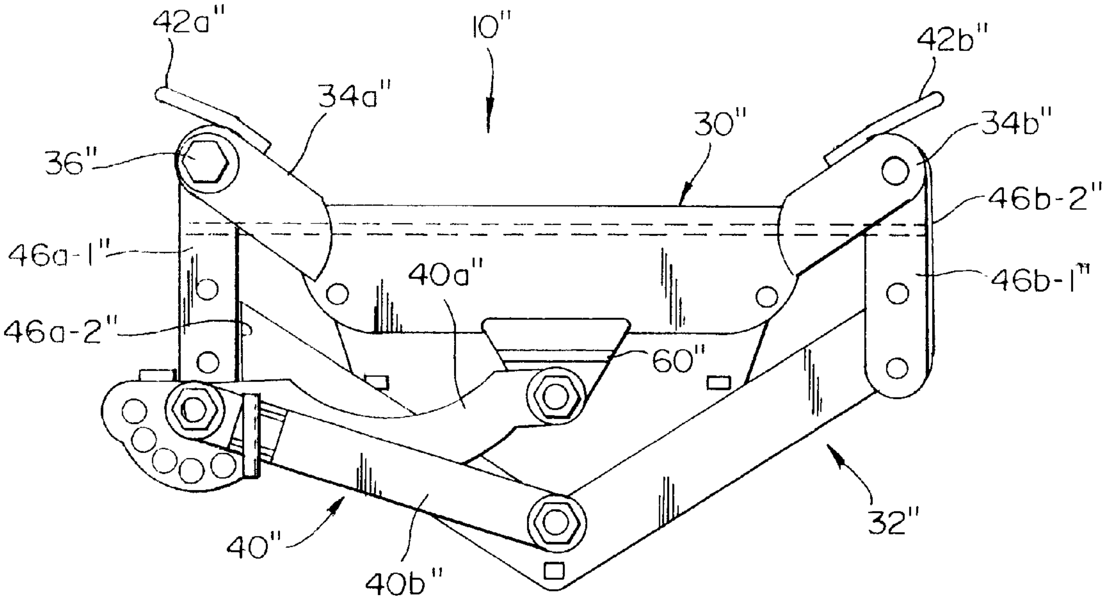
FIGS. 7 and 8 are elevation views showing still another embodiment of the bracket in respectively lowered motor operative position and raised motor stowed position.
Figure 8:
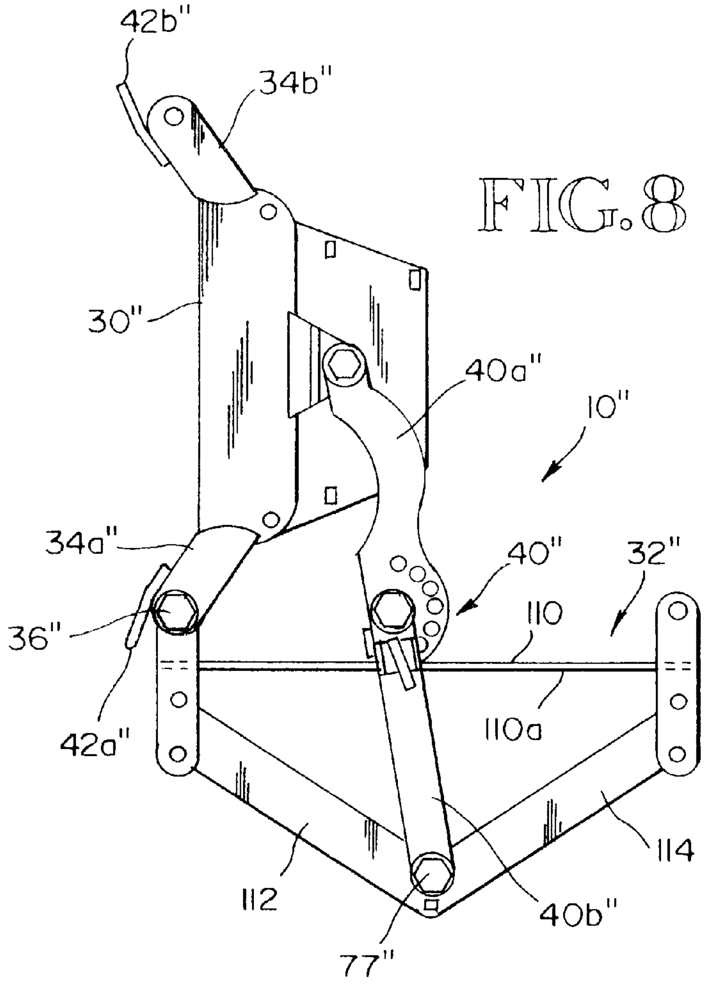

FIGS. 7 and 8 show another alternate embodiment of the invention in which bracket 10' is formed by a transom support structure 32" having a generally triangular open framework construction including an upper cross bar 110 that is welded at opposite ends to the paired sets of upstanding lugs 46*a*-1",-2" and 46*b*-1".-2" which form bearings for the journals on ear-shaped lugs 52*a*-1",-2" and 52*b*-1",-2" of pivoting motor mount channel structure 30". The underside 110*a* of bar 110 rests on the upper support edge of transom in the same way as the flange portion 32*b* of the above described embodiment. The remainder of support structure 32" is formed by a V-shaped lower portion of welded together bars 112 and 114 that project downwardly from and in the same plane as the inside lugs 46*a*-1" and 46*b*-1" and the apex serves as the pivot point for bolt 77" for the transom supported end of the locking toggle 40" reducing the weight of the bracket and clearing obstructions on the transom. The outside or aft lugs 46*a*-2" and 46*b*-2" fit against the aft wall of the transom as in the above embodiment and the structure is secured to the transom wall by fasteners as above. This configuration allows the bracket to be adapted to different transom shapes by using more elongated ear journals on channel structure 30" which lift the motor clamped thereon higher to clear obstructions on the dinghy. The locking toggle 40" is essentially the same as in the above embodiment except the toggle link 40*a*" is curved along its length to nest more compactly between the lower toggle link 40*b*" when the motor is lowered into operating position as in FIG. 8.

While only particular embodiments have been disclosed herein, it will be readily apparent to persons skilled in the art that numerous changes and modifications can be made thereto, including the use of equivalent means, devices, and method steps without departing from the spirit of the invention.

I claim:

1. An outboard motor stow pivot bracket for stowing a motor in a generally vertical orientation while mounted on a support edge of a transom of a dinghy which has been moved from a level position up into a generally vertical stowed position, and in which the motor has a motor thrust stem and a standard transom clamp for mounting the motor on the support edge of the transom and including tilt adjustment having a first axis for rotating the motor thrust stem about the first axis into and out of contact with the water when the dinghy is launched, comprising:

a channel structure sized to fit onto a motor support edge of a dinghy transom and having outside surfaces adapted to receive the standard transom clamp of an outboard motor for supporting such outboard motor in a motor operating position on a dinghy transom;

a pair of complementary pivot journals formed at opposed ends of said channel structure;

pivot bolt means for connecting said channel structure at one of said pair of complementary pivot journals to a dinghy transom so that said channel structure can be swung thereabout on a second axis orthogonal to the first axis into a motor stowing position in which an opposite, unconnected end of said channel structure projects away from the transom; and a locking device connected to said channel structure for releaseably locking said channel structure in said motor stowing position, whereby a motor clamped onto said channel structure can be pivoted about the second axis between the motor operating position and said motor stowing position when a dinghy is moved into a vertical stowed position.

2. The motor stow pivot bracket of claim 1, wherein said locking device comprises a pair of toggle links rotatably joined together adjacent first ends, one of said toggle links rotatably connected at a second end to a support on a dinghy transom such that said toggle links articulate between a collapsed configuration about the joined ends when said channel structure is in the motor operating position and an extended configuration when said channel structure is swung to the motor position, and a hand operable release lock locking said toggle links in said extended configuration.

3. The motor stow pivot bracket of claim 2, wherein said hand operable release lock comprises pin receiving holes in said toggle links adjacent the first ends located so as to align when said toggle links are in the extended configuration and a hand operable locking pin insertable in the holes when so aligned.

4. The motor stow pivot bracket of claim 3, wherein said hand operable release lock comprises a spring biased hand releasable lock member mounted on a first of said toggle links, and a second of said toggle links has an arc shaped array of detents engageable by said lock member to select a adjustable angle of said channel structure relative to said support and transom.

5. The motor stow pivot bracket of claim 4, wherein one of said detents is located to be engaged by said lock member when said toggle links are in said extended configuration, and another of said detents is located to be engageable by said lock member when said toggle links are in said collapsed configuration and is oversized to allow the full weight of said channel structure and a motor clamped thereon to rest securely on said transom and support structure.

6. The motor stow pivot bracket of claim 5 wherein said arc shaped array of detents has a plurality of intermediate safety stop detents, whereby the safety stop detents catch on the spring biased lock member and temporarily hold said channel structure during movement to and from the motor stowing position if a user releases said hand operable lock.

7. The motor stow pivot bracket of claim 6, wherein said spring biased hand releasable lock member is a pin having an end and a handle provided on the opposite end.

8. The motor stow pivot bracket of claim 2, wherein said hand operable release lock comprises detents in at least one of said toggle links, and a hand operated detent engaging and releasing member cooperating with said detents.

9. The motor stow pivot bracket of claim 2, further comprising locking toggle support means adapted to be mounted on a dinghy transom, and said toggle links having one link rotatably connected adjacent its second end to said locking toggle support means, and having the other link rotatably connected adjacent its second end to said channel structure.

10. The motor stow pivot bracket of claim 1, wherein said locking device is connected to said channel structure at a location substantially equidistant from said pivot journals so that said channel structure can be releaseably locked by said locking device when said pivot bolt means is relocated to the opposite complementary pivot journal of said channel structure for swinging said channel structure between said operating and stow positions from its opposite end.

11. The motor stow pivot bracket of claim 1, further comprising a support for said locking device and for said pivot bolt means adapted to be mounted on a dinghy transom.

12. The motor stow pivot bracket of claim 11, wherein said support comprises a support structure mountable on a wall of a dinghy transom and having a pair of complementary pivot bearings at opposed ends projecting above a motor support edge of a dinghy transom and in registration with said pair of complementary pivot journals of said channel structure, and said locking device is connected to said support structure at a position below and substantially equidistant from said pivot bearings.

13. The motor stow pivot bracket of claim 12, wherein said support structure has a stop portion adapted to rest on a motor support edge of a dinghy transom, and wherein said pivot bearings comprise upstanding lugs joined to said support structure and projecting above said stop portion for being connected to pivot journals by said pivot bolt means to locate the second axis proximate and above a dinghy transom.

14. The motor stow pivot bracket of claim 13, wherein said support structure comprises a vertical tongue portion that projects downward from said support structure and said locking device is rotatably connected to said tongue portion.

15. The motor stow pivot bracket of claim 14, wherein said channel structure has front and back parallel walls joined by a connective saddle shaped to rest on said support structure, and said pivot journals are provided on ear shaped lugs that project outwardly from said connective saddle in a direction away from said front and back parallel walls.

16. The motor stow pivot bracket of claim 15, further comprising a pair of complementary upstanding handles on said channel structure, one adjacent each of said pivot journals.

17. The motor stow pivot bracket of claim 1, a pair of handles spaced at opposed ends of said channel structure respectively adjacent said pivot journals, whereby the one of said handles on the unconnected end of said channel structure can be used to lift said channel structure and a motor clamped thereto to and from the stowing position.

18. The motor stow pivot bracket of claim 1, wherein said support structure is an open framework sized and shaped to fit on a dinghy transom and supports a pair of journal lugs that project above a motor support edge of the transom.

19. An outboard motor stow pivot bracket for stowing a motor in a generally vertical orientation while mounted on a support edge of a transom of a dinghy which has been moved from a level launched position up into a generally vertical stowed position, and in which the motor has a motor thrust stem and a standard transom clamp for mounting the motor on the support edge of the transom and including tilt adjustment having a first axis for rotating the motor thrust stem about the first axis into and out of contact with the water when the dinghy is launched, comprising:

a channel structure having front and back walls joined by a connective saddle wall and sized to fit onto a motor support edge of a dinghy transom and having outside surfaces adapted to receive the standard transom clamp of an outboard motor for supporting the outboard motor in a motor operating position on a dinghy transom;

a pair of complementary ear-shaped lugs formed with pivot journals at laterally opposed ends of said channel structure;

a pivot joint connecting said channel structure at one of said pair of complementary ear-shaped lugs to a dinghy transom adjacent a motor support edge so that said channel structure can be swung thereabout on a second axis orthogonal to the first axis into a motor stowing position in which an opposite, unjoined end of said channel structure projects away from the transom; and a locking toggle connected to said channel structure at said front wall and intermediate said ear-shaped lugs for releaseably locking said channel structure in said motor stowing position, whereby a motor clamped onto said channel structure can be pivoted about the second axis between an operating position and said motor stowing position when a dinghy fitted with the pivot bracket is moved up into a generally vertical stowed position.

20. An outboard motor stow pivot bracket for stowing a motor in a generally vertical orientation while mounted on a support edge of a transom of a dinghy which has been moved from a level launched position up into a generally vertical stowed position, and in which the motor has a motor thrust stem and a standard transom clamp for mounting the motor on the support edge of the transom and including tilt adjustment having a first axis for rotating the motor thrust stem about the first axis into and out of contact with the water when the dinghy is launched, comprising:

a motor mounting structure sized to fit over a motor support edge of a dinghy transom and having front and back walls and an upper saddle wall adapted to receive the standard transom clamp of an outboard motor;

at least one pivot journal formed on said motor mounting structure;

a pivot joint connecting said motor mounting structure at said pivot journal to a dinghy transom so that said motor mounting structure can be swung thereabout on a second axis orthogonal to the first axis into a motor stowing position in which an opposite, unconnected end of said motor mounting structure projects upwardly away from the transom; and a locking device connected to said motor mounting structure for releaseably locking the motor mounting structure in said motor stowing position, whereby a motor clamped onto said motor mounting structure can be pivoted about the second axis between an operating position and said motor stowing position when a dinghy fitted with the pivot bracket is moved into a stowed position.

21. An outboard motor stow pivot bracket for stowing a motor in a generally vertical orientation while mounted on a support edge of a dinghy which has been moved from a level launched position up into a generally vertical stowed position, and in which the motor has a motor thrust stem and a standard transom clamp for mounting the motor on the support edge of the transom and including tilt adjustment having a first axis for rotating the motor thrust stem about the first axis into and out of contact with the water when the dinghy is launched, comprising:

a motor mount sized to fit on a motor support of a dinghy transom and adapted to receive a standard transom clamp of an outboard motor;

at least one pivot journal formed on said motor mount;

a structure connecting said motor mount at the pivot journal to a dinghy transom so that said motor mount can be swung thereabout on a second axis orthogonal to the first axis into a motor stowing position in which the mount extends away from such transom.

22. An outboard motor stow pivot bracket for stowing a motor in a generally vertical orientation while mounted on a support edge of a dinghy which has been moved from a level launched position up into a generally vertical stowed position, and in which the motor has a motor thrust stem and a standard transom clamp for mounting the motor on the support edge of the transom and including tilt adjustment having a first axis for rotating the motor thrust stem about the first axis into and out of contact with the water when the dinghy is launched, comprising:

a motor mount sized to fit on a motor support of a dinghy transom and adapted to receive a standard transom clamp of an outboard motor;

a structure connecting said motor mount to a dinghy transom so that said mount can be swung thereabout on a second axis orthogonal to the first axis into a motor stowing position in which the motor mount extends away from such transom.

* * * * *